Aug. 8, 1967 T. G. GRANRYD 3,334,702
FOUR WHEEL DRIVE ARTICULATED VEHICLE WITH MEANS
TO TRANSFER POWER BETWEEN THE WHEELS
Filed Dec. 14, 1964 4 Sheets-Sheet 1

INVENTOR.
Thorvald G. Granryd
BY
Atty.

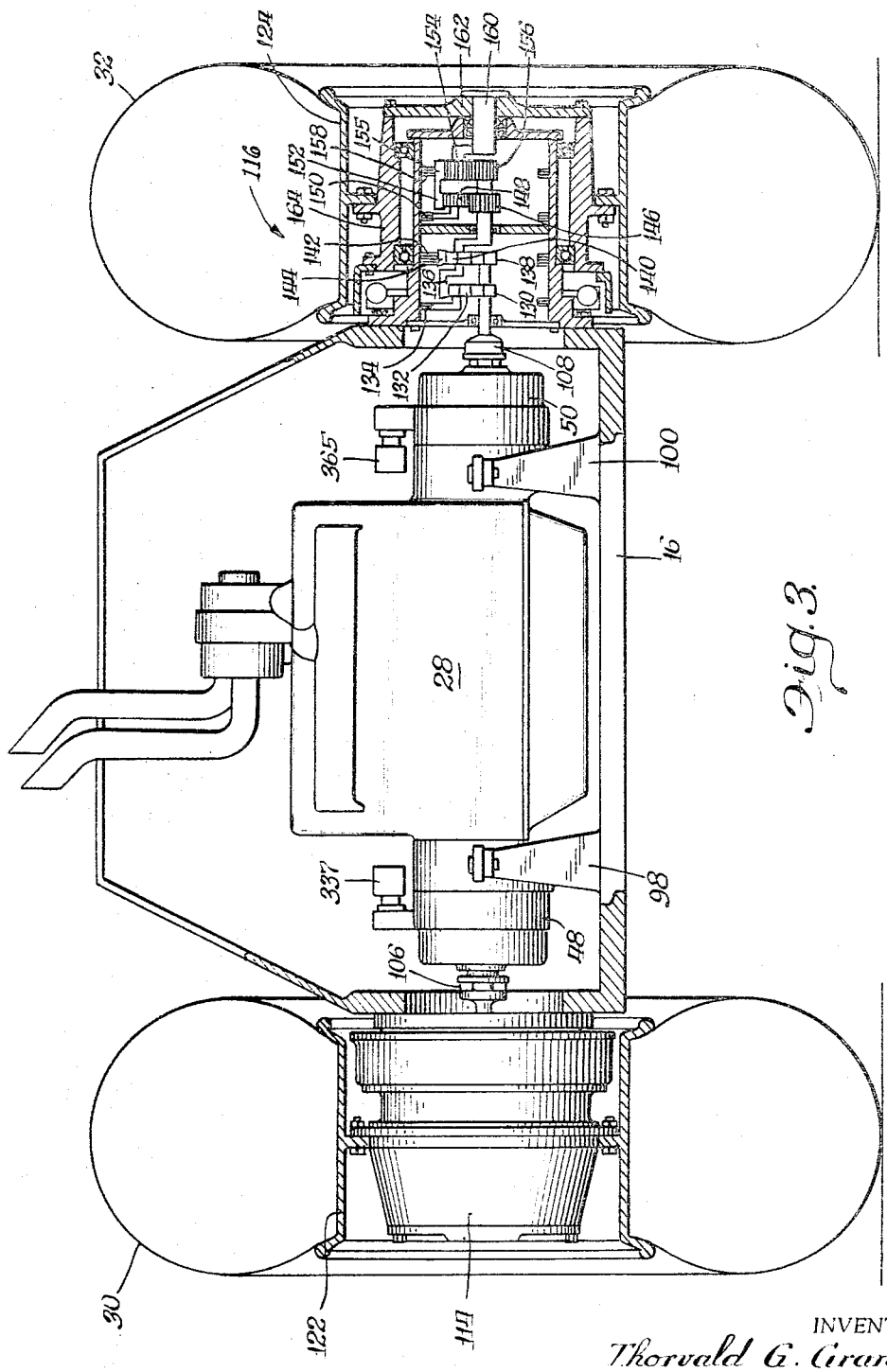

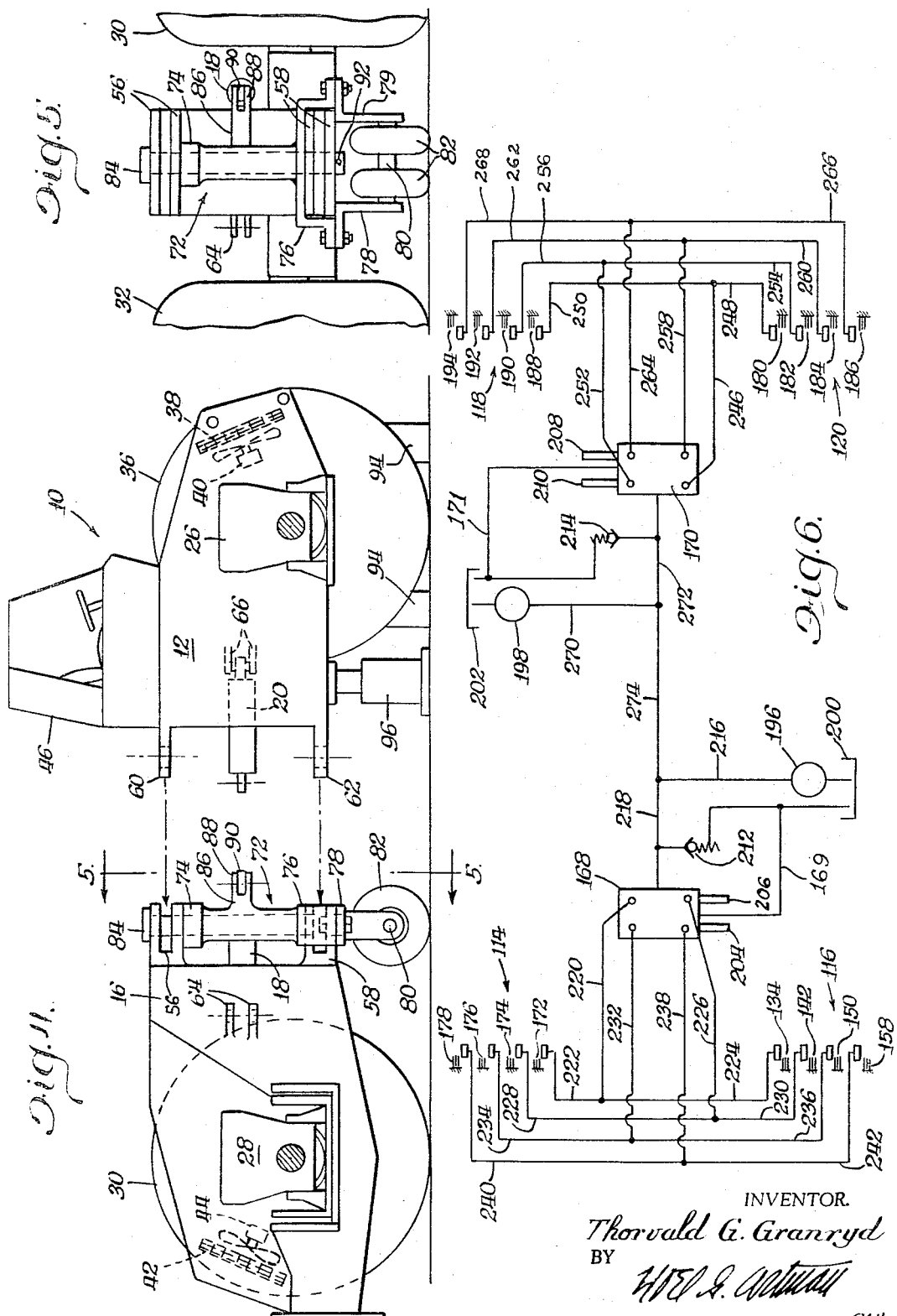

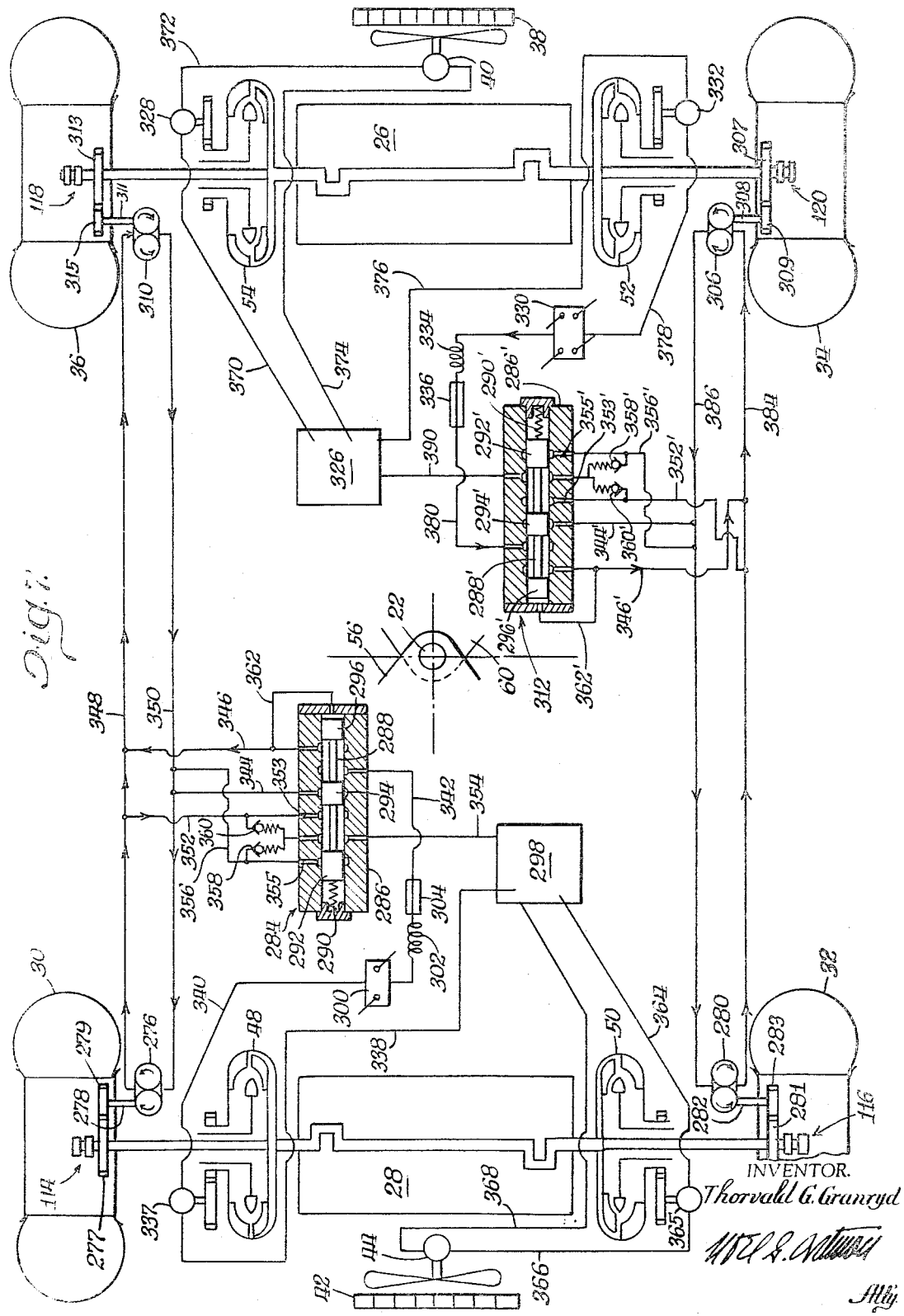

United States Patent Office 3,334,702
Patented Aug. 8, 1967

3,334,702
FOUR WHEEL DRIVE ARTICULATED VEHICLE WITH MEANS TO TRANSFER POWER BETWEEN THE WHEELS
Thorvald G. Granryd, Libertyville, Ill., assignor to International Harvester Company, a corporation of Delaware
Filed Dec. 14, 1964, Ser. No. 418,022
7 Claims. (Cl. 180—51)

This invention relates to an improved driving means for vehicles and more specifically relates to a vehicle drive means incorporating an individual wheel drive and a power transfer system.

Construction equipment such as rubber-tired pusher-dozers generally would make use of this improved individual wheel drive invention. However, it is contemplated that the invention may also be used in front end loaders and in a wide variety of other vehicles in which power is transmitted through wheels to provide useful work.

In conventional construction equipment of the type described major goals of the designer have been to provide a lower center of gravity, a shorter turning radius, optimum weight distribution for high-speed travel, improved visibility for the operator, and better traction at the wheels. Therefore it is an object of this invention to provide these design features through a novel individual wheel drive power means.

It is another object of this invention to provide a highly maneuverable articulated vehicle with individual wheel drive means mounted transversely on shortened frame sections.

Still another object is to provide a novel articulated vehicle with individual wheel drive in which the sections of the vehicle can be selectively operated independently of each other.

Another object of this invention is to provide a wheeled vehicle in which the engine is mounted transversely of the vehicle and between the opposing drive wheels with the drive train for each wheel connected to either end of the engine.

Still another object is to provide a vehicle with individual wheel drive in which power is transferred between the wheels as the weight on the wheels varies.

Another object of this invention is to provide a vehicle with an individual wheel drive in which hydraulic pump-motor units geared to each wheel are used to transfer power between wheels as required, and in which a hydraulic circuit is used to provide cooled and filtered fluid at a supercharge pressure to said units.

Other objects of this invention will become apparent from the following specification and drawings, in which:

FIGURE 3 is a rear elevation view of the pusher-dozer of FIGURE 1 in cross section taken along the line 3—3 of FIGURE 1;

FIGURE 4 is a side elevation view of another embodiment of the invention of FIGURE 1 in which an articulated vehicle is shown with the frame sections separated for independent operation;

FIGURE 5 is a front elevation view of the invention of FIGURE 4 taken along the line 5—5 of FIGURE 4;

FIGURE 6 is a schematic diagram of the transmission control system for the individual wheel drive vehicles shown in the embodiments of FIGURES 1 and 4; and FIGURE 7 is a schematic diagram of the power transfer system of this invention.

Figure 1:
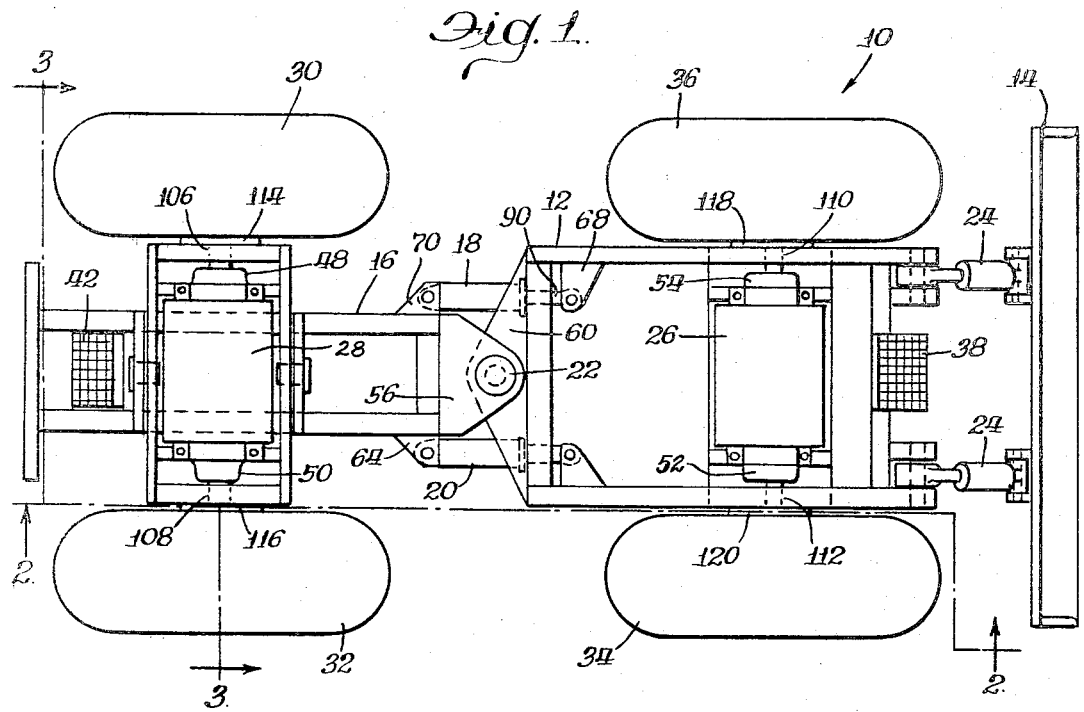
FIGURE 1 is a top plan view of one embodiment of this invention with parts of the body of the pusher-dozer removed for clarity.

In general this invention comprises a novel articulated vehicle with the motive power means mounted transversely and with a system which transfers power between separate wheels. With presently existing articulated construction equipment the engine is mounted longitudinally on the vehicle with such components as the grille, radiator, cooling fan, torque converter, drive shafts and transmission generally mounted in line with the engine. The result is a power source of considerable length. To accommodate such a power source the vehicle must be designed to either have a large wheel base or have weight extending rearwardly of the wheels. However, the former design results in an objectionally large turning radius while the latter design results in poor roading qualities since more bouncing would occur at high speeds.

The present invention contemplates mounting the engines transversely on each section of an articulated vehicle and between the wheels with the power being delivered individually to each wheel. With the engine mounted in this novel manner the wheel base may be as short as the diameter of the wheel permits.

This invention will also result in better weight distribution since the major weight of the engines will be centered over the wheels. Thus a lower center of gravity is obtained to provide a more stable vehicle. Furthermore the consequent lower vehicle profile results in improved visibility for the operator.

Where the engines are mounted on each frame section of an articulated vehicle then the operator can separate the sections and independently drive and control each section by attaching a "third-wheel" assembly. The requirement for this type of control may arise where the sections are being transported to the construction site, for example. Steering of one of these sections is accomplished by attaching one of the hydraulic steering motors to an arm on the "third-wheel" assembly.

It is well known that construction vehicles develop work in direct proportion to the power available at each wheel, and that this available power is in turn absorbed as useful horsepower depending on the weight at each wheel. However, in going through a typical sequence of construction operations a vehicle, such as a dozer for instance, will have a fluctuating weight between the forward and rearward wheels. While dozing the dozer blade will exert a downward force on the ground which results in a decreased weight on the forward wheels and an increased weight on the rearward wheels. This means that the rearward wheels can effectively absorb more power than the forward wheels. Similarly, when the dozer is pushing a scraper it may be desirable to obtain additional weight from the scraper for more traction. This is accomplished when the pusher operator raises the pusher blade slightly to give an increased upward force on the scraper with a resulting increased downward force on the front wheels of the pusher. The front wheels are now capable of absorbing more horsepower than the rear wheels and it would be desirable if a transfer of power from rear to front power units can be effected.

In the present invention this power transfer is accomplished by gearing a hydraulic pump-motor to each wheel and interconnecting the front and rear pump-motors on either side by hydraulic conduits. When weight is removed from one wheel its associated pump-motor will turn faster This will pump hydraulic fluid under pressure to the interconnected pump-motor which in turn will operate as a motor to deliver power to its associated wheel. A make-up valve is provided to deliver a slight supercharge of hydraulic fluid to the pump-motors.

Figure 2:
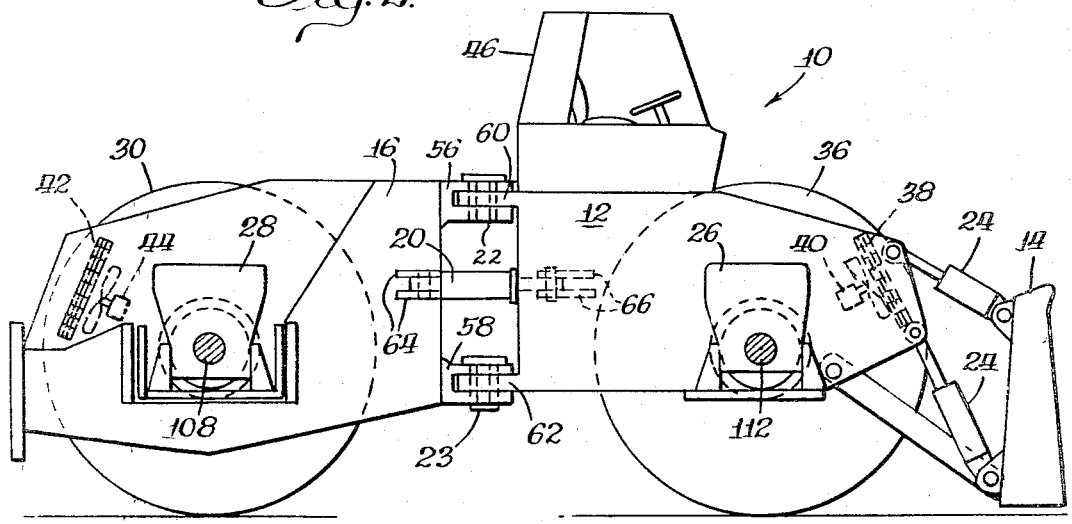
FIGURE 2 is a side elevation view of the pusher-dozer of FIGURE 1 in partial cross section taken along the line 2—2 of FIGURE 1.

In detail, and with reference to the drawings in which like reference numerals refer to like elements in the several views, FIGURES 1 and 2 show a pusher-dozer vehicle indicated generally at 10. This vehicle consists of front frame section 12 which is articulated to rear frame section 16 about an upright axis. Upper clevis 56 and lower clevis 58 are secured to the rear portion and engage brackets 60 and 62 which are secured to the front section. Vertical bores in the clevis members register with vertical bores in the bracket members and pins 22 and 23 are fitted within the bores to join the two sections of the vehicle. The operator's compartment 46 and the associated controls (not shown) are mounted on front section 12 while any desired implement, such as dozer blade 14 or a loader mechanism (not shown) of a design which is well known in the art, may be mounted on the front end of the front section. Extensible hydraulic rams 24 are provided to selectively raise, lower, or tilt the dozer blade. Extensible hydraulic steering rams 18, 20 are provided on either side of the vehicle for angular movement of the front section relative to the rear section. Brackets 64, 66, 68 and 70 are provided to mount the steering rams on the frame sections.

The front engine 26 is mounted transversely on front section 12 and between the opposing front traction wheels 34 and 36. Engine 26 may be of the conventional internal combustion type. Power is delivered from either end of the engine to each of the traction wheels. Radiator 38 is mounted on the front section with the associated fan and motor assembly 40 to provide the cooling function for the engine.

Similarly, rear engine 28 is mounted transversely on rear section 16 and between the opposing rear traction wheels 30 and 32. Radiator 42 is also mounted on the rear section with the associated fan and motor assembly 44 to provide the cooling function for engine 28.

FIGURE 3 shows details of the rear engine mounting and the power train to the wheels. The engine is positioned transversely of the rear section 16 on mounting brackets 98 and 100. Power is transmitted from the right-hand end of the engine 28 into torque converter 50, through drive connection 108, through transmission 116 and then through wheel 124 to tire 32. Power is simultaneously transmitted from the left-hand end of engine 28 into torque converter 48, through drive connection 106, through transmission 114 and then through wheel 122 to tire 30.

With reference to FIGURES 1 and 7 it is seen that front engine 26 is transmitting power into right torque converter 52, drive connection 112, transmission 120 and tire 34. Simultaneously, front engine 26 is transmitting power into left torque converter 54, drive connection 110, transmission 118 and tire 36.

The right torque converters 50 and 52 are conventional and would have a left-hand input rotation where they are mounted on the fly-wheel side of the engines. The left torque converters 48 and 54 are also conventional and would have a right-hand input rotation where they are mounted on the side remote from the fly-wheel side of the engines. These torque converters would differ from torque converters 50 and 52 in having opposite blade angles of the rotating elements.

Any conventional transmission can be utilized with the vehicle in this invention. A planetary transmission with four simple planetary sets and four grounded clutches is shown in FIGURE 3 as a representative type. The reverse gear arrangement of transmission 116 consists of sun gear 130, planet gear 132, grounded clutch 134 and ring gear 136. The forward gear arrangement consists of sun gear 138, planet gear 140, grounded clutch 142 and ring gear 144. The two speed reduction gearing consists of a conventional high speed arrangement and a low speed arrangement of the regenerative type. The low speed gearing consists of sun gear 146, planet gear 148, clutch 150 and ring gear 152, while the high speed gearing consists of sun gear 156, planet gear 154, clutch 158 and ring gear 155. Power is transmitted from transmission 116 through drive spindle 160 into the end plate 162, drum 164 and wheel 124.

The transmission control system is shown diagrammatically in FIGURE 6 and consists of independent hydraulic controls for the front and rear section transmissions. Rear transmission control valve 168 is of the conventional closed-center spool valve type and controls the speed and forward-reverse setting of transmissions 114 and 116. Similarly, front transmission control valve 170 is of the conventional closed-center spool valve type and controls the speed and forward-reverse setting of transmissions 118 and 120. Conventional drain lines 169 and 171 are provided from valves 167 and 170 respectively to permit disengagement of one set of clutches while another set is being engaged.

In operation the hydraulic charging pump 196, which is mounted in any convenient location on the rear section, withdraws hydraulic fluid from reservoir 200 and directs it under pressure through conduits 216 and 218 into control valve 168. Valve spool 206 is provided to select reverse or forward gears in the transmission. Similarly, valve spool 204 is provided to select high or low speeds in the transmission. These spools may be operated in any convenient manner such as by mechanical, electrical or air operated means (not shown). With spool 206 in the reverse position hydraulic fluid is directed from control valve 168 through conduit 220 into conduits 222 and 224, thereby locking clutch plates 172 and 134 in the well known manner. When spool 206 is in the forward position, fluid is directed through conduit 226 into conduits 228 and 230, thereby locking clutch plates 174 and 142 respectively. When spool 204 is in the low speed position fluid is directed through conduit 232 into conduits 234 and 236, thereby locking clutch plates 176 and 150 respectively. When spool 204 is in the high speed position, fluid is directed through conduit 238 into conduits 240 and 242, thereby locking clutch plates 178 and 158 respectively. A conventional pressure relief valve 212 is provided in conduit 218.

The operation of the transmission control system on the front section is similar to that on the rear section and consists of a charging pump 198 which withdraws fluid from reservoir 202 and directs it through conduit 270 into conduit 272 and transmission control 170. A make-up line 274 is provided between the two hydraulic control systems to compensate for normal variations in flow from each pump. A conventional pressure relief valve 214 is also provided in conduit 272. With spool 210 in the reverse position fluid is directed from control valve 170 through conduit 246 into conduits 248 and 250, thereby locking clutch plates 180 and 188 respectively. With spool 210 in the forward position fluid is directed through conduit 252 into conduits 256 and 254 thereby locking clutch plates 190 and 182 respectively. With spool 208 in the low speed position fluid is directed through conduit 258 into conduits 262 and 260, thereby locking clutch plates 192 and 184 respectively. With spool 208 in the high speed position fluid is directed through conduit 264 into conduits 268 and 266, thereby locking clutch plates 194 and 186 respectively. It is understood that control means (not shown) may be provided to synchronize the actuation of spools 204, 206, 208 and 210 so that engagement of corresponding clutches in the four wheels will occur simultaneously.

FIGURES 4 and 5 illustrate an embodiment of the present invention in which the front and rear sections are separated for easy transportability. With the sections separated a third wheel assembly 72 can be positioned on either one of the sections to provide support so that the section can be independently operated. The third wheel assembly 72 consists of spindle 74 which has a bore through its major axis. A U-shaped bracket 76 is secured to the lower end of spindle 74 by suitable means such as welding. A pair of brackets 78, 79 are secured to the lower end of bracket 76 in transverse spaced-apart relationship. An axle 80 is secured transversely to the lowermost margin of brackets 78, 79 and tires 82 are in turn secured to axle 80. Forwardly extending steering arm 86 is secured intermediate the ends of spindle 74 and has a clevis 88 at its outer end.

With the third wheel assembly 72 in position on rear section 16, for example, a pin 84 is inserted through the bore of clevis 56, the bore of spindle 74 and the bore of clevis 58. The pin 84 is secured in position by any suitable retaining means such as bolt 92.

Steering of the rear section is accomplished by securing the rod 90 of hydraulic ram 18 to the clevis 88 of steering arm 86. Where the third wheel assembly is secured to the front section 12 then hydraulic ram 20 would similarly be secured to the steering arm 86. The make-up line 274 of the hydraulic control of FIGURE 6 would be disconnected for independent control of the transmissions. Blocks 94 and hydraulic pack 96 are shown as providing support for the front section 12.

In FIGURE 7, I have shown a schematic diagram of an individual wheel drive vehicle in which power is automatically transferred between front and rear wheels on either side of the vehicle as weight varies on each wheel. This unique power transfer is accomplished by providing hydraulic pump-motor units at each transmission for transmitting power either away from or into the wheel. For this purpose I provide in transmission 114 an additional gear 277 meshing with gear 279 which drives shaft 278 on pump-motor 276. Similarly, in the left front transmission 118 an additional gear 313 meshes with gear 315 which turns shaft 311 on pump-motor 310. The pump-motor units 276 and 310 are conventional and operate either as pumps when troque is applied to their shafts or as motors when fluid pressure is supplied to their inlet ports. Conduits 348 and 350, which are capable of withstanding high pressure hydraulic fluid, interconnect the pump-motor units 276 and 310 to form a closed hydraulic circuit therebetween. Thus conduit 348 connects the discharge side of unit 276 with the suction side of unit 310, while conduit 350 connects the discharge side of unit 310 with the suction side of unit 276. Make-up valve 284 supplies cooled and filtered hydraulic fluid from pump 337 to the hydraulic circuit at a slight supercharge pressure. Make-up valve 284 directs this hydraulic fluid into either conduit 348 or 350, depending upon the direction of power transfer between the pump-motor units 276 and 310.

Hydraulic pumps for operating auxiliary equipment are driven by gear sets (shown diagrammatically) connected to the engines. Thus pump 337 withdraws fluid from reservoir 298 through conduit 338 and delivers it into conduit 340 and hydraulic steering valve 300. Valve 300 is preferably of the conventional open-center spool valve type and directs fluid to the hydraulic rams 18, 20 through conduits (not shown) for the steering of the vehicle. Fluid from pump 337 is also directed from steering valve 300 through cooler 302, filter 304 and conduit 342 into make-up valve 284. Pump 365 withdraws fluid from reservoir 298 through conduit 364 and delivers it to conduit 366 and a conventional hydrostatic fan motor 44, while conduit 368 returns the fluid back to the reservoir.

Similarly, pump 328 withdraws fluid from reservoir 326 through conduit 370 and delivers it to conduit 372 and a conventional hydrostatic fan motor 40 while conduit 374 returns the fluid back to the reservoir.

Pump 332 withdraws fluid from reservoir 326 through conduit 376 and delivers it to conduit 378 and dozer blade control valve 330. Valve 330 is preferably of the conventional open-center spool valve type and directs fluid to the hydraulic rams 24 for positioning of the dozer blade.

A power transfer system is also provided in this embodiment of the invention on the right-hand side of the vehicle. The power transfer system for the right-hand side is similar to that described above and consists of a front pump-motor 306 which is geared to transmission 120 through shaft 308, gear 309 and gear 307. Pump-motor 280 is provided on the rear section and is geared to transmission 116 through shaft 282, gear 283 and gear 281. Conduits 384 and 386, which are capable of withstanding a high fluid pressure, provide a closed fluid circuit between the pump-motor units. Thus, conduit 386 connects the discharge side of pump-motor 306 with the suction side of pump-motor 280 while conduit 384 connects the discharge side of pump-motor 280 with the suction side of pump-motor 306.

A make-up valve 312 is also provided on the front section and differs from make-up valve 284 only in that fluid pressure is provided through the dozer blade control valve 330 and pump 332. Thus, fluid is directed at a supercharge pressure from control valve 330 into cooler 334, filter 336, conduit 380 and then into make-up valve 312.

The construction and operation of the make-up valves 284 and 312 are identical and a detailed description will only be given for valve 284. It is understood that the description applies equally to valve 312 while corresponding elements thereof are indicated in the drawing with a prime symbol (').

The make-up valve 284 consists of a valve spool 288 which is movable within housing 286 to either of two positions to automatically direct supercharge fluid into the power transfer circuit. The spool 288 carries longitudinally spaced-apart lands 292, 294, and 296. Spool 288 is normally urged toward a right-hand position by bias means, such as spring 290, and is moved toward a left-hand position when fluid pressure is transmitted through conduit 362 to act against the right end of spool 288. When the spool is in the right-hand position conduit 346 directs the supercharge fluid from conduit 342 into conduit 348. Also in this position of the valve conduit 352 withdraws fluid from conduit 348 and returns it through conduit 354 to reservoir 298. Orifice 353 is provided in conduit 352 to insure a supercharge pressure in conduit 348.

With the spool in the left-hand position land 296 closes conduit 346 and land 294 opens conduit 344. The supercharged hydraulic fluid is now directed from conduit 342 through conduit 344 in to the conduit 350. Also in this position of the valve land 294 closes conduit 352 while land 292 opens conduit 356. Excess fluid is now returned from conduit 350 through conduit 356 and conduit 354 back to reservoir 298. An orifice 355 is provided in conduit 356 to insure a supercharge pressure in conduit 350.

Valves 358 and 360 provide a pressure relief function for conduit 350 and 348 respectively. The discharge sides of the pressure relief valves 358 and 360 are always open to reservoir 298 through conduit 354.

In a preferred embodiment of this invention it is assumed that each enginer 26, 28 has a 600 HP output. Assuming an even distribution of weight from the vehicle through the wheels each wheel can absorb 300 HP and no power transfer is necessary. In this situation pump-motor units 276, 310 are revolving at the same speed and no pressure build-up in the power transfer system occurs. The make-up valve 284 is now injecting supercharge fluid at approximately 20 p.s.i. through conduit 346 and withdrawing the same amount of fluid from conduit 352.

When the weight distribution shifts to the rear then the rear wheels can absorb more horsepower than the front wheels and power transfer is desirable. Thus with a 50% increase in weight on the rear wheels a 50% increase in horsepower absorption can take place. The traction tire 30 can now absorb 450 H.P. Rear engine 28 can supply 300 H.P. while front engine 26 can supply 150 H.P. through the power transfer system. As the weight is relieved from the front traction tire 36 it will begin to spin at a faster speed due to the infinitely variable characteristics of the torque converter 54. Pump-motor unit 310 will now rotate at a faster speed. Since the unit 310 is revolving at a higher speed than unit 276, it will operate as a hydraulic pump and direct fluid under pressure through conduit 350 into unit 276. Unit 276 will now operate as a motor and the torque which it develops will be transmitted through gears 279 and 277 to apply the added horsepower to traction tire 30. During this operation make-up valve 284 will remain in the normal position and direct cooled and filtered make-up fluid at a supercharge pressure into the power transfer circuit through conduit 346 while removing the same amount through conduit 352.

When the weight distribution shifts to the front of the vehicle then a transfer of power from the rear wheels to the front wheels is desirable. In this situation the rear traction tires 30 will lose traction and start to spin; and pump-motor unit 276 will now begin to rotate at a higher speed. Unit 276 will now operate as a pump directing high pressure fluid through conduit 348 to unit 310. The increased pressure will operate unit 310 as a motor and the torque which it develops will drive gears 315 and 313 to apply the added horsepower to front traction tire 36. The major portion of the fluid discharged from unit 310 will return by conduit 350 to unit 276.

With pump 276 spinning at a high rate of speed the pressure in conduit 348 will build up to a high value, such as 2500 p.s.i. This pressure will be transmitted through conduits 346 and 362 to act against the spool 288, shifting it against the bias of spring 290 to the left position. The supercharge pressure from conduit 342 will be directed into conduit 350 through conduit 344, as previously described. Also, excess fluid will be returned from conduit 350 through conduit 356 and 354 to reservoir 298.

The operation of the power transfer system on the righthand side of the vehicle is similar to that on the left-hand side. Thus when traction wheel 34 has weight removed from it and begins to revolve at a higher speed then unit 306 will operate as a pump to pressurize conduit 286. This in turn will operate unit 280 as a motor to apply torque to traction wheel 32. In this situation make-up valve 312 is supplying supercharge fluid through conduit 346' to conduit 384 and removing excess fluid from conduit 384 through conduit 352'.

When the right rear traction wheel 32 begins to spin then unit 280 will operate as a pump to pressurize conduit 384. This in turn will operate unit 306 as a motor. Unit 306 will now transmit to traction wheel 34. In this situation the high value of pressure in conduit 384 will be transmitted through conduit 346' and conduit 362' to shift spool 288' to the right position. Make-up valve 312 will now direct supercharge fluid through conduit 344' into conduit 386 and remove excess fluid from conduit 386 through conduit 356'.

It is understood that various changes in the details and arrangement of parts, which have been described and illustrated in order to explain the nature of the invention, may be made by those skilled in the art as may come within the scope of the appended claims without departing from the spirit of the invention.

I claim:
1. In a construction vehicle the combination comprising:
  (a) a frame,
  (b) a first pair of traction wheels mounted on one end of said frame,
  (c) a second pair of traction wheels mounted on the other end of said frame,
  (d) a first engine mounted on said one frame end,
  (e) a second engine mounted on said other frame end,
  (f) first drive means for translating power from said first engine into rotary motion of said first pair of traction wheels,
  (g) second drive means for translating power from said second engine into rotary motion of said second pair of traction wheels, and
  (h) other means for transferring power from said first pair of traction wheels to said second pair of traction wheels responsive to less traction of the first wheels relative to the traction of the second wheels, and from said second pair of traction wheels to said first pair of traction wheels responsive to less traction of the second wheels relative to the traction of the first wheels.

2. In a construction vehicle the combination comprising:
  (a) a frame,
  (b) a first pair of laterally spaced-apart traction wheels mounted on said frame,
  (c) a second pair of laterally spaced-apart traction wheels mounted on said frame,
  (d) a first engine mounter transversely between said first pair of traction wheels,
  (e) a second engine mounted transversely between said second pair of traction wheels,
  (f) first drive means for translating power from said first engine into rotary motion of said first pair of traction wheels,
  (g) second drive means for translating power from said second engine into rotary motion of said second pair of traction wheels, and
  (h) other means for transferring power from said first pair of traction wheels to said second pair of traction wheels in a first condition of weight distribution on said vehicle, and from said second pair of traction wheels to said first pair of traction wheels in a second condition of weight distribution on said vehicle, in which said other means includes a first hydraulic pump-motor geared to said first drive means, a second hydraulic pump-motor geared to said second drive means, first conduit means connecting the outlet of said first pump-motor with the inlet of said second pump-motor, said first pump-motor supplying fluid under pressure to said second pump-motor when said first pair of traction wheels is revolving faster than said second pair of traction wheels, and second conduit means connecting the outlet of said second pump-motor with the inlet of said first pump-motor, said second pump-motor supplying fluid under pressure to said first pump-motor when said second pair of traction wheels is revolving faster than said first pair of traction wheels.

3. In a construction vehicle as defined in claim 2 further comprising a source of fluid under pressure, valve means movable to a first position for connecting said source with said second conduit when said first pump-motor is supplying fluid under pressure to said second pump-motor and to a second position for connecting said source with said first conduit when said second pump-motor is supplying fluid under pressure to said first pump-motor.

4. In a construction vehicle as defined in claim 3 in which said source of fluid under pressure comprises a pump geared to one of said drive means.

5. In a construction vehicle as defined in claim 3 further comprising means for cooling and filtering the fluid from said source of fluid under pressure.

6. In a construction vehicle the combination comprising:
  (a) a frame,
  (b) first and second pairs of laterally spaced-apart traction wheels mounted on said frame,
  (c) said frame having power means connected with each of said traction wheels for delivering power to said first and second pairs of traction wheels, the power delivery to said first pair of traction wheels being independent from the power delivery to said second pair of traction wheels,
  (d) other means for transferring power between said first and second pairs of traction wheels including hydraulic pump-motor means connected with each of said first and second pairs of traction wheels, (e) conduit means for transferring hydraulic fluid between the pump-motor means connected with said first pair of traction wheels and the pump-motor means connected with said second pair of traction wheels, (f) said other means being responsive to a difference in speed between said first and second traction wheels for delivering hydraulic fluid under pressure from the pump-motor means connected with the higher speed traction wheels to the pump-motor means connected with the lower speed traction wheels.

7. In a construction vehicle as defined in claim 6 further comprising additional means for injecting cooled and filtered hydraulic fluid at a supercharge pressure to said conduit means.

References Cited

UNITED STATES PATENTS

| | | | |
|---|---|---|---|
| 2,422,813 | 6/1947 | Walch | 180—51 X |
| 2,701,616 | 2/1955 | Cooper | 180—52 X |
| 3,027,960 | 4/1962 | Ditel | 180—44 |
| 3,061,030 | 10/1962 | Shallenberg | 180—44 |
| 3,157,239 | 11/1964 | Bernotas | 180—51 |

FOREIGN PATENTS

| | | |
|---|---|---|
| 840,263 | 7/1960 | Great Britain. |

A. HARRY LEVY, *Primary Examiner.*